United States Patent [19]

Copley et al.

[11] 4,348,856
[45] Sep. 14, 1982

[54] TRACTOR MOUNTED COTTON HARVESTER

[75] Inventors: Russell D. Copley, Ankeny; Francis E. Schlueter, Des Moines, both of Iowa

[73] Assignee: Deere & Company, Moline, Ill.

[21] Appl. No.: 266,876

[22] Filed: May 26, 1981

[51] Int. Cl.³ ............................................. H01D 46/08
[52] U.S. Cl. ........................................ 56/30; 56/13.6; 56/14.5
[58] Field of Search ...................... 56/28–50, 56/13.6, DIG. 9, 14.5

[56] References Cited

U.S. PATENT DOCUMENTS

| | | | |
|---|---|---|---|
| 2,355,880 | 8/1944 | Macha | 56/40 |
| 2,808,694 | 10/1957 | Beran | 56/35 |
| 3,314,221 | 4/1967 | Forbes | 56/44 |
| 3,606,009 | 9/1971 | Clendenin et al. | 56/30 |

*Primary Examiner*—Robert A. Hafer

[57] ABSTRACT

A cotton harvester for mounting on a tractor or similar vehicle, wherein a transversely extending cross auger frame is supported by a lift frame assembly rearwardly of the rear tractor wheels. Individual cotton harvesting units are supported above the ground by the cross auger frame and include plant passages located generally rearwardly of the rear wheels. The lift frame assembly is pivotally connected to the tractor adjacent the rear axle and includes four-bar linkage structure for positioning the row units in the desired attitude as the cross auger frame is pivoted up and down. The linkage permits the row units to be positioned closely adjacent the rear wheels without interfering with them as the cross auger frame is raised or lowered. A cotton receiving basket is supported directly above the tractor. A cotton conveying system, including a telescoping air duct extending upwardly and forwardly from the cross auger frame and a fan connected to the frame, moves the removed cotton from the row units to the basket. Mounting the cross auger frame rearwardly of the tractor permits two or more row units to be utilized. The rear-mounting arrangement also permits the use of row units and a cross auger frame which are generally identical to that utilized on a self-propelled cotton harvester.

44 Claims, 4 Drawing Figures

TRACTOR MOUNTED COTTON HARVESTER

BACKGROUND OF THE INVENTION

The present invention relates generally to cotton harvesters, and more specifically to a cotton harvester adapted for mounting on a tractor.

Cotton harvesters adapted for mounting on a tractor have, for the most part, been limited to the type wherein two row units are transversely spaced on opposite sides of the tractor body just forwardly of the rear wheels. There is a limited amount of space between the rear wheels and the tractor body, particularly on large tractors, and the row units must be specially designed to fit within the space and to discharge the cotton rearwardly of the rear axle of the tractor to a cotton conveying system which moves the cotton to a basket located above the tractor. It has not been practical to mount such two row harvesters on large tractors because of the space limitations, The row units for such harvesters are also difficult to mount on and remove from the tractor, and once the units are attached, the tractor cannot easily be freed for a use other than harvesting cotton. There is no convenient way to adequately support additional row units for increasing the harvesting capacity beyond two rows. Dust and debris agitated by the row units can impede the operator's visibility in the forward direction.

Other types of harvesters adapted for mounting on a tractor have required that the tractor be driven in the reverse direction. The tractor seat and controls are reversed from their normal position so that the operator faces rearwardly. The cotton harvesting units are connected to the rear end of the tractor with the plant passages opening rearwardly with respect to the normal forward direction of travel of the tractor. Such an arrangement requires a special operator station or cab and limits the range of gear ratios to the number of reverse gears available on the tractor.

It is, therefore, an object of the present invention to provide an improved tractor-mounted cotton harvester.

It is a further object of the invention to provide a tractor-mounted cotton harvester which is quicker and easier to mount on and remove from the tractor than previously available harvesters.

It is still another object of the invention to provide a tractor-mounted cotton harvester which can easily accommodate more than two row units with various row spacings and wherein the row units are supported by a frame directly behind the rear wheels of the tractor in such a manner that the center of gravity of the units is kept relatively close to the rear wheels.

It is yet another object of the invention to provide a tractor-mounted cotton harvester in which the row units are supported closely adjacent the rear wheels by a lift assembly and a row unit support frame which extends rearwardly from the tractor, and in which the attitude of the row unit support frame is automatically controlled to prevent contact between the row units and rear wheels as the frame is raised and lowered between transport and field-working positions.

It is another object of the invention to provide a tractor-mounted cotton harvester which reduces the amount of dust and debris in the forward direction which would hinder the operator's vision.

It is a further object of the present invention to provide a tractor-mounted cotton harvester which utilizes two or more row units which are substantially identical to row units utilized with a self-propelled cotton harvester. It is a further object to provide such a harvester wherein the cross auger frame which supports the row units is generally identical to the frame utilized on a self-propelled harvester.

It is another object of the invention to provide a tractor-mounted cotton harvester wherein the entire cotton harvesting and cotton conveying mechanisms are substantially rearwardly of the rear wheels of the tractor and wherein a cotton basket is supported directly above the tractor. It is a further object to provide such a cotton harvester which is easily removable from or attachable to the tractor and wherein the center of gravity of harvesting and conveying mechanisms is close to the rear wheels of the tractor so the harvester is not back heavy.

In accordance with the above objects, front and rear upright support structures are connected to the body of the tractor and support a cotton basket above the tractor. A lift frame assembly including four-bar linkage structure is connected near the rear of the tractor to the rear support structure. A cross auger frame including upright support beams forming part of the four-bar linkage structure of the lift frame assembly extends generally transversely to the forward direction rearwardly of the drive wheels of the tractor. Two or more individual row harvesting units are supported from the cross auger frame and include plant passages with openings lying generally behind the rear drive wheels of the tractor. Lift cylinders connected between the lift frame assembly and the rear axle of the tractor rock the lift assembly to move the cross auger frame and the row units between an upper transport position and a lower field-working position. The four-bar linkage structure angularly positions the cross auger frame and row units as the lift frame assembly is pivoted. The linkage causes the frame and row units to angle downwardly toward the front as the frame is lifted to prevent contact between the front of the units and the rear tractor wheels. The lift frame assembly and cross auger frame can be easily removed from or attached to the tractor. A cotton conveying system includes a telescoping air duct connected to the rear of the cross auger frame and extending upwardly and forwardly to the cotton basket over the tractor. A fan utilized for forcing the cotton upwardly toward the basket is braced from the cross auger frame.

The cotton harvester is supported entirely by the tractor, and the harvesting units and cross auger frame can be easily mounted on or removed from the tractor. Visibility for the operator is increased since the row units are mounted rearwardly of the rear tractor wheels to reduce the dust and debris stirred up between the operator and the front of the vehicle. Row units which have to be specially designed to fit between the tractor body and the front of the rear wheels are eliminated, and the cross auger frame may be generally of the type utilized with self-propelled cotton harvesters. The harvester can be mounted on large tractors without modification of the row units. Transverse spacing of the row units on the cross auger frame is simplified over previously available tractor-mounted harvesters, and more than two row units may be attached to the frame and easily adjusted for various row spacings. The action of the four-bar linkage structure to angle the row units downwardly as the cross auger frame is lifted permits the units to be positioned closely to the rear tractor wheels so that the harvester is not back heavy. The linkage structure also maintains a satisfactory angle between the telescoping portion and the remainder of the air duct so that there is no binding of the duct as the cross auger frame is raised and lowered.

These and other objects, features and advantages of the present invention will become apparent from the description which follows taken with the drawings.

DESCRIPTION OF THE PREFERRED EMBODIMENT

Figure 1:
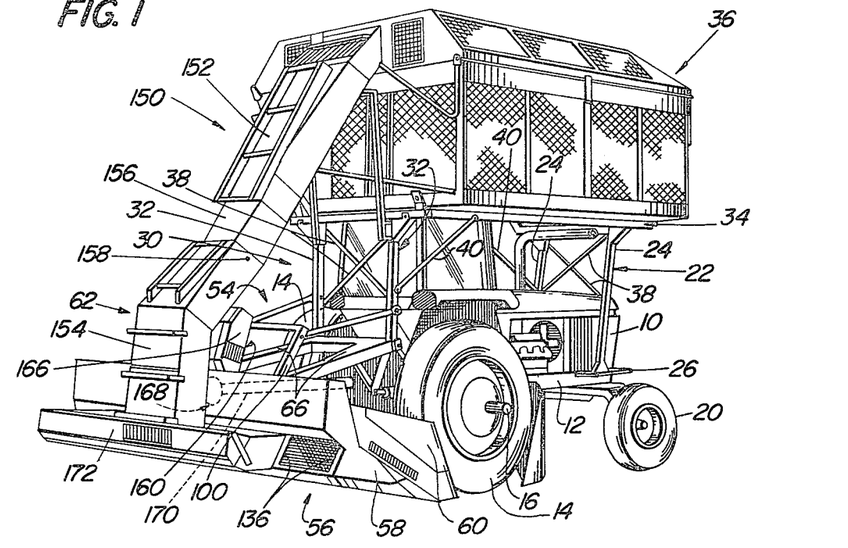
FIG. 1 is a right rear perspective view of the cotton harvester of the present invention.
Figure 2:
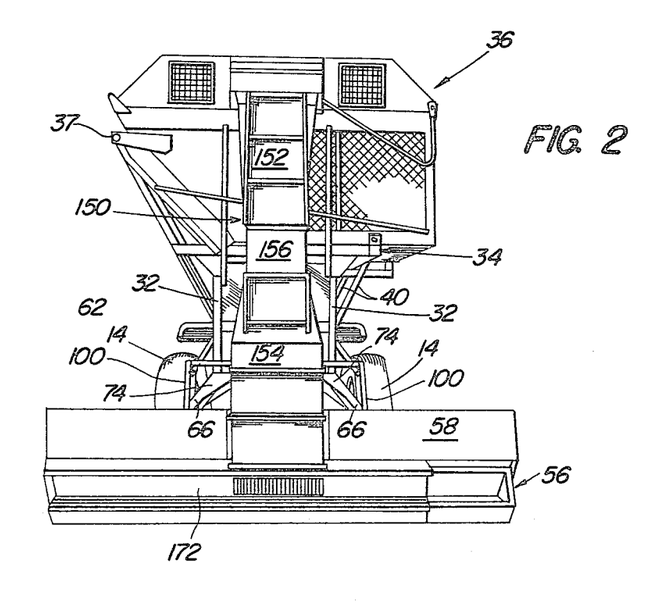
FIG. 2 is a rear view of the cotton harvester shown in FIG. 1.
Figure 4:
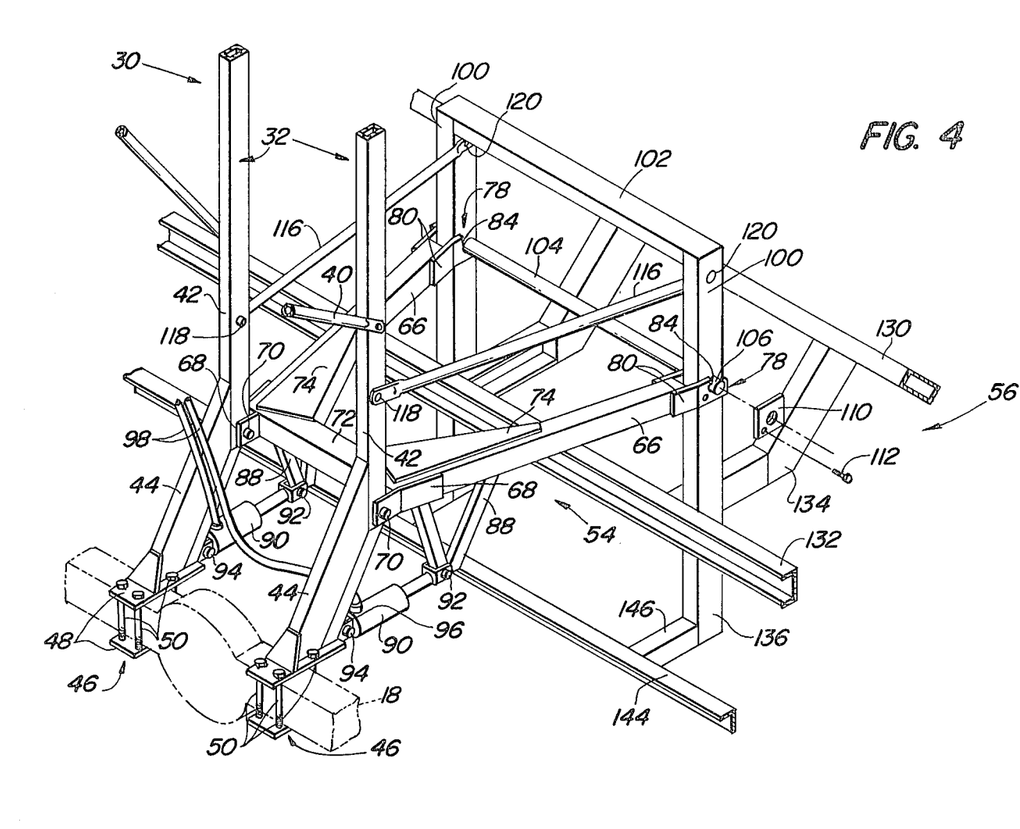
FIG. 4 is a perspective view of a portion of the support structure, lift frame assembly, and a portion of the cross auger frame of the harvester shown in FIG. 1.

Referring now to FIGS. 1 and 2, therein is shown a tractor or similar mobile power unit 10 having a generally fore-and-aft extending body 12 supported above the ground by rear traction wheels 14. The traction wheels 14 are carried on rear axles 16 which extend outwardly from a rear axle member 18 (FIG. 4). The forward end of the body 12 is supported by transversely spaced front steerable wheels 20. The rear traction wheels 14 and the front steerable wheels 20 are transversely spaced such that they may be positioned between rows of cotton as the tractor moves forwardly over the field.

A front post assembly 22 (FIG. 1) includes a pair of upright posts 24 connected at their lower ends to a support assembly 26 which is bolted to the frame 12 of the tractor 10. The posts 24 extend upwardly above the top of the tractor 10.

A rear upright support structure 30 includes a pair of transversely spaced support posts 32 mounted on the rear axle member 18 and terminating at upper ends which are at substantially the same level as the top of the upright posts 24. A basket support frame 34 connected to the upper ends of the posts 24 and 32 extends over substantially the entire length of the fore-and-aft body 12. A cotton basket 36 is carried by the basket support frame 34 above the tractor and is connected for pivoting about a fore-and-aft extending axis 37 located above the left side of the tractor frame 12 (FIG. 2).

Cross braces 38 extend between the upright posts 24 and between the posts 32 to stabilize the post assemblies and strengthen the overall structure. Additional diagonal braces 40 are connected between the posts and the basket support frame.

Each support post 32 includes a vertical tubular member 42 (FIG. 4) having its lower end connected to a reinforced lower support member 44 which in turn is connected to the rear axle member 18 by a bracket 46. The bracket 46 includes a pair of generally horizontally disposed plates 48 connected on opposite sides of the axle member 18 by bolts 50. The reinforced lower support members extend upwardly and rearwardly from the axle member 18 to a juncture with the vertical tubular members 42.

A lift frame assembly indicated generally at 54 is rockably connected to the rear upright support structure 30 for movement in a substantially vertical direction. The lift frame assembly 54 extends rearwardly from the support structure 30 and is pivotally connected to a cross auger frame 56 which in turn supports a cross auger housing 58, transversely spaced cotton harvesting row units 60, and a cotton conveying system indicated generally at 62. The lift frame assembly 54 includes a pair of main support beams 66 which extend rearwardly and diverge outwardly from the support posts 32. Each main support beam 66 includes a forward bracket 68 pivotally connected to the corresponding support posts 32 by a pin 70. A channel-shaped member 72 extends transversely between and is welded to the forward ends of the pair of support beams 66. Upper and lower reinforcing plates 74 are welded between the support beams 66 and the member 72 for added strength. Each main support beam 66 terminates in a rear frame support bracket 78 which includes a pair of plates 80 welded to the sides of the support beam 66. The plates 80 include an upwardly opening slot 84.

Extending downwardly from each main support beam 66 of the frame assembly 54 is a cylinder bracket 88. A hydraulic lift cylinder 90 is connected at its rod end by a pin 92 to the lower portion of the bracket 88. The anchor end of the cylinder 90 is connected by a pin 94 to a bracket 96 carried at the lower end of the support member 44 adjacent the support post bracket 46. The cylinders 90 are connected through hoses 98 to a source of hydraulic fluid on the tractor 10 and are extended and retracted in unison to pivot the main support beams 66 about the pins 70 to raise and lower the frame support brackets 78 between the transport and field-working positions.

Figure 3:
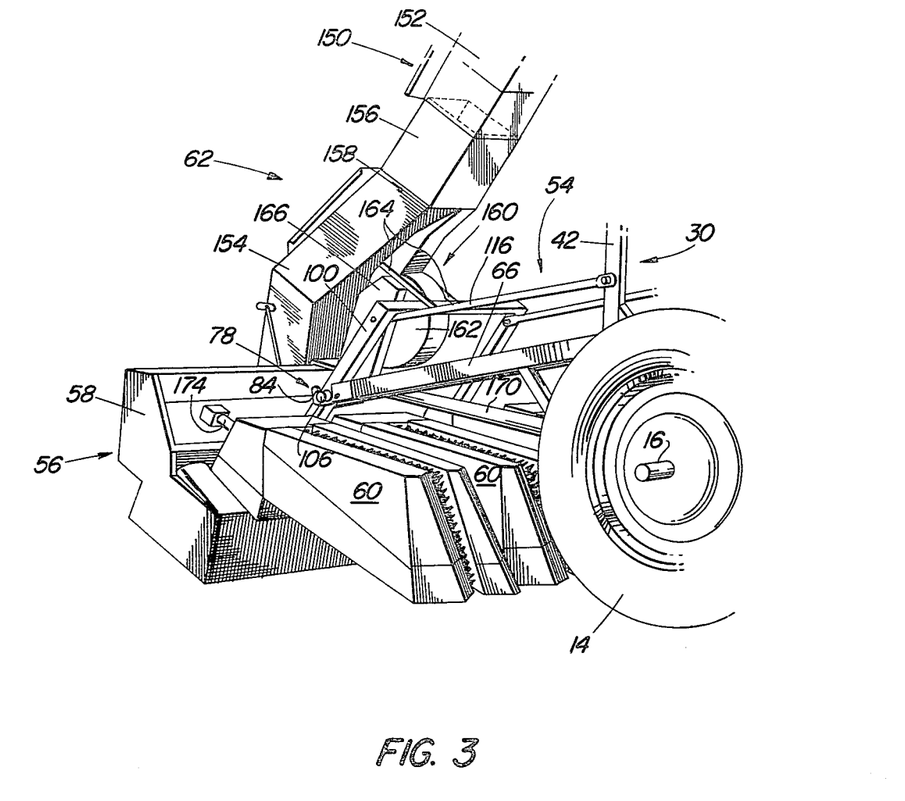
FIG. 3 is a right front perspective view of the rear portion of the harvester shown in FIG. 1.

The cross auger frame 56 includes generally upright support beams 100 transversely spaced at their upper end by a tubular member 102 which is welded to and forms a cap over the beams 100. A horizontal transverse bar 104 extends between the support beams 100 and passes through the beams terminating in end portions 106 which extend outwardly beyond the side of the beams. The plates 80 of each frame support bracket 78 extend on opposite sides of the corresponding upright support beam 100, and the circular bar 104 is received in the slots 84 of the plates. After the frame support bracket 78 is positioned about the beam 100 and is raised so the end portion 106 of the rod 104 enters the slots 84, apertured end plates 110 are placed over the end portions 106 of the rod and are connected by bolts 112 to the brackets to prevent the rod 104 from raising with respect to the brackets. The end plates 110 thereby lock the cross auger frame 56 to the main support beams 66 of the lift frame assembly 54 while they permit relative pivotal motion between the beams 100 and the support beams 66. Attitude control links 116 are pivotally connected above the main support beams 66 to the support posts 32 by pins 118. The control links 116 extend rearwardly and outwardly from the pivotal connection with the support posts 32 to rear portions connected by pins 120 to the upright support beams 100 just below the tubular member 102. The attitude control links 116, together with the corresponding main support beams 66, form a portion of four-bar linkage structure which positions the cross auger frame 56 with respect to the horizontal as the cylinders 90 are extended and retracted to raise and lower the frame. In the preferred embodiment, as best seen in FIGS. 1 and 3, the upright support beams 100 extend forwardly and upwardly from the remainder of the cross auger frame 56. The attitude control links 116 prevent the forward portions of the row units 60 from interfering with the rear wheels 14 as the main support beams 66 are rocked upwardly to raise the cross auger frame. The links 116 are shorter than the beams 66 so that as the lift frame assembly 54 is rocked upwardly, the cross auger frame 56 will roll forwardly (in the clockwise direction as viewed in FIG. 1) to lower the front of the units 60 with respect to the frame 56. This rolling action permits the front of the row units 60 to be positioned directly behind the wheels 14 and yet not contact the rear of the wheels as the units are lifted with the cross auger frame to their transport position. The links 116 also hold the cross auger frame in a pre-selected attitude during harvesting to maintain the desired fore-and-aft slope on the harvesting units 60. The cross auger frame 56 supports substantially the entire weight of row units 60 both when they are in the transport position above the ground and when they are in the lowered field-working position.

The cross auger frame 56 is generally of conventional construction and includes transverse tubular or channel-shaped frame members 130 and 132 connected by fore-and-aft extending frame members 134. Generally upright frame members 136 form the rear support for the portion of the cross auger housing 58 behind the cross auger (not shown). In the preferred embodiment, the upright beams 100 are vertical extensions of the centrally located frame members 136. An angle (not shown) is welded to the front of the frame member 132 and is slotted to receive the connecting portion of the row units 60. An angle 144 is welded to forwardly extending frame members 146 which support the floor below the cross auger. The angle 144 carries one end of the cylinders (not shown) which are utilized with conventional automatic height-sensing mechanisms to raise and lower the individual row units 60 during harvesting. The details of the row units 60, as well as the structure for attaching the row units to the cross auger frame are shown in detail in co-pending application, Ser. No. 266,877, entitled ROW UNIT FOR A COTTON HARVESTER, filed concurrently herewith and incorporated herein by reference. It should be noted here that although the cross auger frame 56 is generally of conventional construction, the upright support beams 100 have been added to permit the auger frame 56 to be connected to the lift frame assembly 54. The entire cross auger frame 56 with the row units 60 attached thereto may be selectively removed from the tractor and the rest of the cotton harvester by removing the pins 120 and the end plates 110 and lowering the main support beams 66 from the position shown in FIG. 3 so that the end portion 106 of the rod 104 is free of the slots 84 in the frame support brackets 78.

The cotton conveying system 62 includes a telescoping duct system 150 having an upper duct section 152 supported by the basket frame 34 and a lower duct section 154 supported on the cross auger frame 56. An intermediate duct section 156 is connected at its lower end to the section 154 by a pair of bolts 158 which extend through the respective sidewalls of the sections. The upper end of the intermediate duct section 156 is slidably received into the lower end of the section 152 so that lower duct section 154 can move up and down with respect to the section 152 as the cross auger frame 56 is raised and lowered. When the operator wishes to remove the cross auger frame 56 with the row units 60 from the tractor, he simply removes the two bolts 158, lifts the intermediate section 156 above the lower duct section 154, and removes the section. The section 152 remains with the basket 36 and the section 154 remains with the cross auger frame. When connecting the cross auger frame 56 to the tractor, the operator merely reverses the procedure to provide a continuous path from the cross auger to the basket 36. The four-bar linkage structure formed in part by the main support beams 66 and the attitude control links 116 maintains sufficient alignment between the upper and lower sections 152 and 154 to prevent the intermediate section 156 from binding in the lower end of the section 152.

The cotton conveying system also includes a fan 160 having a housing 162 opening into the lower duct section 154. The fan housing 162 is connected to a pair of fore-and-aft extending angles 164 which are connected at their opposite ends to the lower duct section 154 and tubular member 102, respectively, so that the fan 160 is fixed with respect to the cross auger frame 56. A conventional fan belt drive (not shown) is contained within a drive housing 166 and is powered by a drive pulley, indicated generally at 168 in FIG. 1, operably connected to a drive shaft 170 which extends rearwardly from the power takeoff of the tractor 10. The fan 160 blows air upwardly into the duct system 150 to suck cotton from the central area of the cross auger up into the lower duct section 154 and thereafter propel the cotton upwardly into the basket 36. Heavy green bolls will settle into a green boll box 172 supported under the section 154 by the cross auger frame 56.

Cotton harvesting and conveying mechanisms in the row units 60 are driven from unit drive shafts 174 operably connected to a conventional belt drive system (not shown) of the type shown in the aforementioned U.S. Pat. No. 3,716,976. The belt drive system for the row units is also drivingly connected to the power takeoff of the tractor through the drive shaft 170 and pulley 168. It is to be understood that other types of power transmission systems may be utilized with the present invention, including a gear type transmission.

The harvester shown in FIGS. 1-3 includes four row units 60 transversely spaced on the cross auger frame 56. The outermost row unit 60 on each side receives a row of cotton outside and rearwardly of the corresponding rear drive wheel 14 of the tractor. A pair of innermost row units 60 receive two rows of cotton between and rearwardly of the drive wheels 14. Alternatively, any number of rows of cotton from one to three or more can be accommodated by positioning the appropriate number of row units 60 at the proper locations along the cross auger frame 56. The rearward location of the frame 56 and units 60 permits more than two units to be easily attached and adjusted for various row spacings without interference from the tractor body.

Having described the preferred embodiment, it will be apparent that modifications can be made without departing from the scope of the invention as defined in the accompanying claims.

We claim:

1. A cotton harvester adapted for forward movement over a field of transversely spaced rows of cotton plants, the harvester comprising:
   a transverse frame assembly;
   a plurality of transversely spaced harvesting units, each unit including a fore-and-aft extending plant passage with a forward mouth for receiving a row of cotton plants and means for removing the cotton from the plants;

means for mounting the harvesting units on the transverse frame assembly with the respective plant passage mouths extending generally forwardly of said frame assembly;

a mobile power unit including a fore-and-aft extending body and front and rear wheels supporting the body for forward movement through the field, said wheels being transversely spaced to run between rows of cotton plants;

a cotton basket supported on and above the power unit;

means for supporting the transverse frame assembly from the mobile body substantially rearwardly of the rear wheels with the plant passage mouths of the mounted units located adjacent a transverse upright plane intersecting the rearmost extremeties of the rear wheel, wherein a substantial portion of the plant passage extends rearwardly of the upright plane; and cotton conveying means extending upwardly from the harvesting units to the cotton basket for conveying the removed cotton to the basket.

2. A cotton harvester comprising:

a mobile power unit having a fore-and-aft extending body with a rear axle member supported above the ground by rear wheels for movement forwardly over the ground, a generally upright support structure connected to the power unit body;

a cotton receptacle carried by the support structure above the power unit body;

a generally fore-and-aft extending rockable lift assembly having its fore end supported on the power unit body and its aft end extending substantially rearwardly of the rear wheels;

a transverse frame assembly connected to the aft end of the lift assembly;

cotton harvesting units transversely spaced on the frame and extending forwardly therefrom, each harvesting unit including a plant passage located generally forwardly of the transverse frame assembly and rearwardly of the rear ground engaging wheels for receiving a row of cotton plants therein, and means for removing the cotton from the plants;

means for rocking the lift assembly to move the harvesting units between a raised transport position and a lowered harvesting position; and conveying means for moving the cotton removed from the plants to the cotton receptacle.

3. The invention as set forth in claim 2 wherein the conveying means includes an air duct supported by the transverse frame and extending upwardly and forwardly therefrom to the receptacle, and a fan connected to the transverse frame and having an air outlet opening into the air duct.

4. The invention as set forth in claim 2 wherein the upright support structure includes a pair of generally upright transversely spaced support posts connected at their lower ends to the rear axle member and at their upper ends to the receptacle, and wherein the lift assembly is pivotally connected at its fore end to the support posts.

5. The invention as set forth in claims 2 or 4 wherein the transverse frame assembly includes a generally upright support beam and a transverse cross auger frame rigidly connected to the upright support beam, and wherein the harvesting units are connected to the cross auger frame, and the lift assembly includes upper and lower links pivotally connected at their opposite ends to the upright support beam and the support structure, respectively, to form a four-bar linkage structure with the upright support beam and the support structure.

6. The invention as set forth in claim 5 wherein the upper and lower links extend generally parallel to each other.

7. The invention as set forth in claim 6 wherein the means for rocking the lift assembly comprises a hydraulic cylinder connected between the support structure and a portion of one of the fore-and-aft extending links rearwardly of the pivotal connection with the support structure.

8. The invention as set forth in claim 2 further including means for selectively attaching and removing the transverse frame assembly from the lift assembly, said means comprising a first member connected to the transverse frame assembly and a second member connected to the aft end of the lift assembly, and means for releasably locking the first and second members against relative vertical movement.

9. A cotton harvester for removing cotton from transversely spaced rows of cotton plants, the harvester comprising;

a mobile power unit including a fore-and-aft extending frame, and front and rear wheels supporting the frame for forward movement over the ground;

a cotton receptacle supported by the frame generally above the mobile unit;

a fore-and-aft extending lift frame assembly connected near its fore end to the aft end of the mobile unit and having its aft end extending substantially rearwardly of the rear wheels;

means for moving the aft end of the lift frame vertically with respect to the tractor frame;

a transversely extending harvesting unit support frame connected to the aft end of the lift frame and movable vertically therewith;

fore-and-aft extending cotton harvesting units including forward crop receiving openings for receiving rows of cotton plants and means for removing cotton from the plants;

means connecting the aft ends of the harvesting units to the unit support frame for supporting the forward cropreceiving openings generally forwardly of said frame and rearwardly of the rear tractor wheels;

a cotton conveying duct extending between the harvesting unit support frame and the cotton receptacle; and means for conveying the removed cotton from harvesting units through the duct to the receptacle.

10. The invention as set forth in claim 9 wherein the cotton harvesting units have forward ends located ajacent the rear wheels of the power unit, the cotton harvester further comprising attitude control means for positioning the unit support frame with respect to the horizontal to prevent contact between the forward ends and rear wheels as the support frame moves with the lift frame.

11. The invention as set forth in claim 9 further comprising a pair of generally upright support posts having lower ends connected to the power unit frame adjacent the rear wheels and upper ends terminating above the power unit, and means connected to the upper ends for supporting the cotton receptacle, and wherein the lift frame assembly is pivotally connected at its fore end to the upright support posts.

12. The invention as set forth in claim 11 wherein the lift frame assembly includes a pair of lower fore-and-aft extending support beams pivotally connected to the respective support posts, means for pivotally connecting the aft ends of said beams to the harvesting unit support frame, and attitude control means for controlling the angle of the support frame with respect to the ground as the lift frame is moved up and down.

13. The invention as set forth in claim 11 wherein the means for moving the aft end of the lift frame comprises an extensible and retractable hydraulic cylinder having one end connected to one of the support posts and the other end connected to the lift frame assembly for pivoting the latter.

14. The invention as set forth in claim 12 wherein the attitude control means comprises a link connected between the support frame and the power unit frame and offset vertically from one of the support beams.

15. For a tractor having a fore-and-aft extending frame supported at its fore end by steerable wheels and at its aft end by transversely spaced drive wheels carried by a rear axle member, said tractor adapted for traveling forwardly through a field of row crops with the wheels between adjacent pairs of rows, a harvesting assembly comprising:
 a transversely extending harvester unit frame including a pair of generally upright transversely spaced support beams and transverse support structure rigidly connected to said beams;
 a plurality of fore-and-aft extending row units supported adjacent their aft ends by the support structure, each of said row units including a forward plant receiving opening for receiving a row of plants forwardly of the support structure, and means for removing the crop from the plants;
 bracket means connectible to and for support by the tractor frame;
 a pair of fore-and-aft extending link means having aft ends connected to the respective upright support beams and including forward portions extending generally above and forwardly of the row units;
 means for pivotally connecting the forward portions of the link means to the bracket means, said link means adapted to space the unit frame rearwardly of the aft drive wheels when the bracket means is connected to the tractor frame; and
 means for rocking the link means about their pivotal connection with the bracket means for moving the unit frame between raised transport and lowered field-working positions.

16. The invention as set forth in claim 15 further comprising:
 means pivotally connecting the aft ends of the link means to the support beams, and attitude controlling means for positioning the unit frame with respect to the horizontal as the link means are rocked to move said frame.

17. The invention as set forth in claim 16 wherein the attitude controlling means comprises a second pair of fore-and-aft extending link means generally parallel to but offset vertically from the first-mentioned pair of link means, said second pair pivotally connected at their opposite ends to the bracket means and the unit frame.

18. The invention as set forth in claim 17 wherein said first and second link means have different lengths for rocking the unit frame as it is moved between the raised and lowered positions.

19. A cotton harvester adapted for forward movement over a field of transversely spaced rows of cotton plants, the harvester comprising:
 a mobile power unit including a fore-and-aft extending frame and front and rear wheels supporting the frame for forward movement through the field, said wheels being transversely spaced to run between rows of cotton plants;
 a cotton receptacle supported by the power unit frame;
 a transverse frame assembly rockably supported on the power unit frame rearwardly of and movable vertically with respect to said frame;
 a plurality of transversely spaced fore-and-aft extending harvesting units connected at their aft ends to the transverse frame assembly and extending forwardly therefrom, the forward ends of the units including crop receiving openings for receiving rows of cotton plants therein rearwardly of the rear wheels, the harvesting units including means for removing cotton from said rows of cotton plants;
 means for conveying the removed cotton from the harvesting units to the receptacle; and
 power means for vertically moving the transverse frame assembly.

20. The invention as set forth in claim 19 including means for supporting the cotton receptacle above the power unit frame and forwardly of the transverse frame assembly.

21. The invention as set forth in claims 19 or 20 wherein the means for conveying the removed cotton comprises an air duct extending between the harvesting units and the cotton receptacle, and a blower connected to the transverse frame assembly and having an outlet connected to the air duct.

22. The invention as set forth in claim 21 wherein the air duct comprises an upper section connected to the receptacle and a lower section connected to the transverse frame assembly, and means telescopingly connecting the upper and lower sections together for permitting the sections to move relative to each other as the transverse frame assembly moves vertically.

23. The invention as set forth in claim 22 further comprising means for positioning the transverse frame assembly with respect to the horizontal as the assembly is moved vertically to maintain a predetermined alignment between the upper and lower sections of the air duct.

24. The invention as set forth in claim 23 wherein the means for positioning comprises four-bar linkage structure connected between the transverse frame assembly and the mobile power unit.

25. A cotton harvester adapted for forward movement over a field of transversely spaced rows of cotton plants, the harvester comprising:
 a mobile power unit including a fore-and-aft extending frame, and front and rear wheels supporting the frame for forward movement through the field, said wheels being transversely spaced to run between rows of cotton plants;
 vertically extending support structure carried by the power unit frame;
 a cotton receptacle mounted on the vertically extending support structure above the power unit frame;
 a fore-and-aft extending lift assembly connected at its fore end to the aft end of the power unit frame and extending rearwardly to a free end movable vertically with respect to said frame;

means for vertically moving the free end of the lift assembly;

a transversely extending row unit support frame connected to and movable with the free end of the lift assembly substantially rearwardly of the rear wheels;

at least two row harvesting units with crop openings transversely spaced on, and supported above the ground substantially entirely by, the unit frame forwardly of the row unit support frame for receiving rows of cotton plants rearwardly of the rear wheels of the power unit, said row units movable with the row unit frame between a lower field-working position and an upper transport position and including harvesting means for removing cotton from the cotton plants; and means for conveying the cotton removed from the plants to the cotton receptacle.

26. The invention as set forth in claim 25 wherein a pair of the row harvesting units are spaced on the unit frame with their crop openings located between the planes of the inside of rear wheels for receiving two rows of cotton rearwardly of and between the rear wheels and wherein a third harvesting unit is positioned with its corresponding crop opening rearwardly and outwardly of one of said rear wheels for receiving a third row of cotton outside said rear wheel.

27. The invention as set forth in claims 25 or 26 wherein said lift assembly includes linkage means for controlling the attitude of the row unit support frame as said frame is moved vertically.

28. The invention as set forth in claim 27 wherein the means for conveying the removed cotton includes a variable length air duct connected between the cotton receptacle and the row unit support frame, and a blower connected to the support frame, said air duct varying in length as the row unit support frame is moved vertically to accommodate changes in distance between said frame and the receptacle.

29. A cotton harvester adapted for forward movement over a field of transversely spaced rows of cotton plants, the harvester comprising:
   a mobile power unit including a fore-and-aft extending frame, and front and rear wheels supporting the frame for forward movement through the field, said wheels being transversely spaced to run between rows of cotton plants;
   vertically extending support structure carried by the power unit frame;
   a cotton receptacle mounted on the vertically extending support structure above the power unit frame;
   a pair of transversely spaced fore-and-aft extending main support beams pivotally connected at their fore ends to the aft end of the mobile power unit frame for rocking about a generally transverse horizontal axis;
   a transverse row unit support frame having a pair of generally upright, transversely spaced support beams;
   means for pivotally connecting the aft ends of the main support beams to the upright support beams to movably support the row unit support frame above the ground;
   power means for rocking the main support beams to move the row unit support frame between an upper transport position and a lower field-working position;
   link means connected between the power unit frame and the upright support beams for controlling the angle of the row unit support frame with respect to the horizontal as said frame is moved between the transport and field-working positions;
   a row harvesting unit supported above the ground by the row unit support frame and extending forwardly therefrom to a free end located rearwardly adjacent one of the rear wheels, said unit including a plant passage opening rearwardly from the free end for receiving a row of cotton plants, and means for removing cotton from the plants received in the plant passage; and
   cotton conveying means supported by the row unit support frame and extending upwardly and forwardly therefrom for conveying the removed cotton to the cotton receptacle.

30. The invention as set forth in claim 29 wherein the link means is vertically offset from the support beams and together with said beams comprises four-bar linkage structure.

31. The invention as set forth in claim 30 wherein the four-bar linkage structure rocks the support frame about its pivotal connection with the main support beams as said frame is moved between the field-working and transport positions to change the slope of the row unit.

32. The invention as set forth in claim 31 wherein the link means is located above the main support beams and has an effective length less than that of said support beams so that as the beams are rocked upwardly the upper end of the support frame rocks forwardly about the pivotal connection.

33. A cotton harvester comprising:
   a mobile power unit having a fore-and-aft extending body with a rear axle member supported above the ground by rear wheels for movement forwardly over the ground;
   a generally upright support structure connected to the power unit body;
   a cotton receptacle carried by the support structure above the power unit body;
   a generally fore-and-aft extending rockable lift assembly having its fore end supported on the power unit body and its aft end extending rearwardly of the rear wheels;
   a transverse frame assembly connected to the aft end of the lift assembly;
   cotton harvesting units transversely spaced on the frame and extending forwardly therefrom, each harvesting unit including a plant passage located generally rearward of the rear ground engaging wheels for receiving a row of cotton plants therein and means for removing the cotton from the plants;
   means for rocking the lift assembly to move the harvesting units between a raised transport position and a lowered harvesting position;
   conveying means for moving the cotton removed from the plants to the cotton receptacle; and
   wherein the transverse frame assembly includes a generally upright support beam and a transverse cross auger frame rigidly connected to the upright support beam, the harvesting units are connected to the cross auger frame, and the lift assembly includes upper and lower links pivotally connected at their opposite ends to the upright support beam and the support structure, respectively, to form a four-bar linkage structure with the upright support beam and the support structure.

34. The invention as set forth in claim 33 wherein the conveyor means includes an air duct supported by the transverse frame and extending upwardly and forwardly therefrom to the receptacle, and a fan connected to the transverse frame and having an air outlet opening into the air duct.

35. The invention as set forth in claim 33 wherein the upright support structure includes a pair of generally upright transversely spaced support posts connected at their lower ends to the rear axle member and at their upper ends to the receptacle, and wherein the lift assembly is pivotally connected to the support posts.

36. The invention as set forth in claim 33 wherein the upper and lower links extend generally parallel to each other.

37. The invention as set forth in claim 36 wherein the means for rocking the lift assembly comprises a hydraulic cylinder connected between the support structure and a portion of one of the fore-and-aft extending links rearwardly of the pivotal connection with the support structure.

38. The invention as set forth in claim 33 further including means for selectively attaching and removing the transverse frame assembly from the lift assembly, said means comprising a first member connected to the transverse frame assembly and a second member connected to the aft end of the lift assembly, and means for releasably locking the first and second members against relative vertical movement.

39. A cotton harvester comprising:
   a mobile power unit having a fore-and-aft extending body with a rear axle member supported above the ground by rear wheels for movement forwardly over the ground;
   a generally upright support structure connected to the power unit body, said upright support structure including a pair of generally upright transversely spaced support posts connected at their lower ends to the rear axle member and at their upper ends to the receptacle;
   a cotton receptacle carried by the support structure above the power unit body;
   a generally fore-and-aft extending rockable lift assembly having its fore end pivotally connected to the support posts and its aft end extending rearwardly of the rear wheels;
   a transverse frame assembly connected to the aft end of the lift assembly;
   cotton harvesting units transversely spaced on the frame and extending forwardly therefrom, each harvesting unit including a plant passage located generally rearward of the rear ground engaging wheels for receiving a row of cotton plants therein and means for removing the cotton from the plants;
   means for rocking the lift assembly to move the harvesting units between a raised transport position and a lowered harvesting position;
   conveying means for moving the cotton removed from the plants to the cotton receptacle; and
   wherein the transverse frame assembly includes a generally upright support beam and a transverse cross auger frame rigidly connected to the upright support beam, the harvesting units are connected to the cross auger frame, and the lift assembly includes upper and lower links pivotally connected at their opposite ends to the upright support beam and the support structure, respectively, to form a four-bar linkage structure with the upright support beam and the support structure.

40. The invention as set forth in claim 39 wherein the conveyor means includes an air duct supported by the transverse frame and extending upwardly and forwardly therefrom to the receptacle, and a fan connected to the transverse frame and having an air outlet opening into the air duct.

41. The invention as set forth in claim 39 wherein the upper and lower links extend generally parallel to each other.

42. The invention as set forth in claim 41 wherein the means for rocking the lift assembly comprises a hydraulic cylinder connected between the support structure and a portion of one of the fore-and-aft extending links rearwardly of the pivotal connection with the support structure.

43. The invention as set forth in claim 39 further including means for selectively attaching and removing the transverse frame assembly from the lift assembly, said means comprising a first member connected to the transverse frame assembly and a second member connected to the aft end of the lift assembly, and means for releasably locking the first and second members against relative vertical movement.

44. The invention as set forth in claim 39 further comprising height-adjusting means for independently raising and lowering the individual cotton harvesting units when the lift assembly is in the lowered harvesting position.

* * * * *